(12) United States Patent
Holloway et al.

(10) Patent No.: US 6,251,173 B1
(45) Date of Patent: Jun. 26, 2001

(54) INK COMPOSITIONS CONTAINING ULTRAVIOLET ABSORBERS

(75) Inventors: Ann P. Holloway, Lexington, KY (US); James F. Feeman, Wyomising, PA (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/429,811

(22) Filed: Oct. 29, 1999

(51) Int. Cl.[7] .................................. C09D 11/02; F21V 9/06
(52) U.S. Cl. ................................ 106/31.49; 106/31.78; 252/589
(58) Field of Search .................... 106/31.49, 31.78; 252/589

(56) References Cited

U.S. PATENT DOCUMENTS

| | | | |
|---|---|---|---|
| 3,004,896 | 10/1961 | Heller et al. | 424/59 |
| 3,018,269 | 1/1962 | Bruno | 524/91 |
| 3,055,896 | 9/1962 | Boyle et al. | 544/209 |
| 3,072,585 | 1/1963 | Milionis et al. | 525/7 |
| 3,074,910 | 1/1963 | Dickson, Jr. | 524/91 |
| 3,081,314 | 3/1963 | Goel et al. | 553/307 |
| 3,159,646 | 12/1964 | Milionis et al. | 548/261 |
| 3,189,615 | 6/1965 | Heller et al. | 548/260 |
| 3,208,813 | 9/1965 | Tanaka et al. | 8/508 |
| 3,214,436 | 10/1965 | Boyle et al. | 548/260 |
| 3,230,194 | 1/1966 | Boyle | 524/91 |
| 3,487,453 | 12/1969 | Sheehan | 8/539 |
| 3,629,192 * | 12/1971 | Heller et al. | 524/91 |
| 3,766,205 | 10/1973 | Heller et al. | 548/261 |
| 3,773,751 | 11/1973 | Brooks, Jr. | 534/581 |
| 4,035,423 | 7/1977 | Gallay et al. | 564/415 |
| 4,041,044 | 8/1977 | White | 548/260 |
| 4,077,971 * | 3/1978 | Fujita et al. | 252/589 |
| 4,127,501 | 11/1978 | Wang et al. | 252/403 |
| 4,127,586 | 11/1978 | Rody et al. | 548/260 |
| 4,256,493 | 3/1981 | Yokoyama et al. | 106/31.58 |
| 4,275,004 | 6/1981 | Winter et al. | 534/581 |
| 4,278,589 | 7/1981 | Dexter et al. | 524/91 |
| 4,283,327 | 8/1981 | Dexter et al. | 524/9 |
| 4,347,180 | 8/1982 | Winter et al. | 534/582 |
| 4,383,863 | 5/1983 | Dexter et al. | 106/150.1 |
| 4,447,511 | 5/1984 | Dexter et al. | 430/15 |
| 4,477,614 | 10/1984 | Dexter et al. | 524/91 |
| 4,481,315 | 11/1984 | Rody et al. | 524/89 |
| 4,587,346 | 5/1986 | Winter et al. | 548/260 |
| 4,864,324 | 9/1989 | Shirota et al. | 106/31.46 |
| 4,892,915 | 1/1990 | Slongo et al. | 526/259 |
| 4,999,433 * | 3/1991 | Prestel et al. | 548/260 |
| 5,073,448 | 12/1991 | Vieira et al. | 428/331 |
| 5,089,050 | 2/1992 | Vieira et al. | 106/31.58 |
| 5,096,489 | 3/1992 | Laver | 106/31.47 |
| 5,096,781 | 3/1992 | Vieira et al. | 106/31.47 |
| 5,124,723 | 6/1992 | Laver | 106/31.47 |
| 5,142,059 | 8/1992 | Burdeska et al. | 548/260 |
| 5,276,161 * | 1/1994 | Prestel et al. | 548/260 |
| 5,431,720 | 7/1995 | Nagai et al. | 106/31.58 |
| 5,443,909 * | 8/1995 | Mandoh et al. | 252/589 |
| 5,489,503 | 2/1996 | Toan | 430/507 |
| 5,498,345 | 3/1996 | Jöllenbeck et al. | 252/589 |
| 5,522,921 * | 6/1996 | Custer | 106/31.49 |
| 5,523,027 * | 6/1996 | Otsuka | 252/589 |
| 5,589,529 | 12/1996 | Reinehr et al. | 524/91 |
| 5,686,633 | 11/1997 | Vieira et al. | 549/434 |

FOREIGN PATENT DOCUMENTS

| | | |
|---|---|---|
| 0794179 * | 9/1997 | (EP) . |
| 63/092607 * | 4/1988 | (JP) . |
| 09/255907 * | 9/1997 | (JP) . |
| 3073299 * | 2/2000 | (JP) . |

OTHER PUBLICATIONS

Derwnet abstract of JP3073299, Feb. 2000.*
Derwent abstract of JP63/092607, Apr. 1988.*
Derwent abstract of 09/255907, Sep. 1997.*

* cited by examiner

*Primary Examiner*—Helene Klemanski
(74) *Attorney, Agent, or Firm*—Jacqueline M. Daspit; Geoffrey Oberhaus

(57) ABSTRACT

Ink compositions containing ultraviolet absorbing compounds of formula I

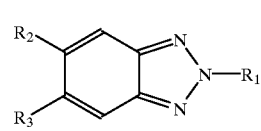

(I)

wherein $R_1$, $R_2$ and $R_3$ are defined herein, and wherein the compound contains one or two —$SO_3M$ groups, one —$SO_3M$ and one —$CO_2M$ group, or two —$CO_2M$ groups. Ink jet ink compositions containing ultraviolet absorbing compounds of formula IV

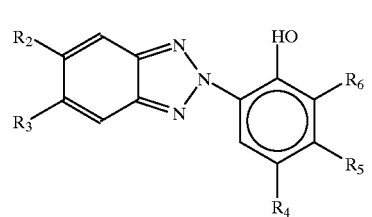

(IV)

wherein $R_2$, $R_3$, $R_4$, $R_5$ and $R_6$ are defined herein, and wherein the compound contains one or two —$SO_3M$ groups, one —$SO_3M$ and one —$CO_2M$ group or two —$CO_2M$ groups, with the provision that either (1) $R_2$ and $R_3$ are not both hydrogen, or (2) $R_5$ is not hydrogen. The ink compositions are adapted for ink jet printing.

26 Claims, No Drawings

INK COMPOSITIONS CONTAINING ULTRAVIOLET ABSORBERS

FIELD OF THE INVENTION

The present invention relates to ink compositions, and more particularly, to ink compositions comprising ultraviolet absorbers. The ink compositions are particularly suitable for ink jet printing.

BACKGROUND OF THE INVENTION

Ink jet printing is accomplished by ejecting ink from a nozzle toward paper or another print medium. The ink may be driven toward the medium in a variety of ways. For example, in electrostatic printing, the ink is driven from a nozzle toward a medium by an electrostatic field. Another ink jet printing procedure, known as squeeze tube, employs a piezo-electric element in the ink nozzle. Electrically-caused distortions of the piezo-electric element pump the ink through the nozzle and toward the print medium. In still another ink jet printing procedure, known as thermal or bubble ink jet printing, the ink, is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly Chapter 13, entitled, "Ink Jet Printing").

Ink compositions used in ink jet printers generally comprise deionized water, a water-soluble or water-miscible organic solvent, and a colorant. Generally, the colorant is a soluble dye or pigment. Unfortunately, inks comprising soluble dyes or pigments can exhibit many problems, such as poor water-fastness, poor light-fastness, clogging of the jetting channels as a result of solvent evaporation and changes in the solubility of the dye, dye crystallization, poor ink quality including ink bleeding and feathering, poor thermal stability, chemical instability, and case of oxidation.

The need for more light-fast inks for ink jet printing is increasing as photo images become more popular. Resistance to fading due to light has been aided in industrial products by incorporation of ultraviolet absorbers (UVAs). Commercially available UVAs are used in textile dying and for additives and coatings. TIo be effective, UVAs processed during textile dying typically require high temperature exposure for a duration of time; these high temperature requirements making the UVAs impractical for personal ink jet printing applications. UVAs used in the coating industry have limited solubility in water and therefore cannot be easily incorporated in conventional aqueous ink jet ink compositions.

SUMMARY OF THE INVENTION

It is, therefore, an object of the present invention to provide an ultraviolet absorber that is water-soluble and can be easily and directly added into ink compositions, particularly ink compositions suitable for ink jet printing.

Other objects and advantages of the present invention will become apparent from the following disclosure.

In a first aspect, the present invention relates to an aqueous ink composition suitable for use in ink jet printers and comprising ink and a water-soluble ultraviolet absorbing compound of the formula

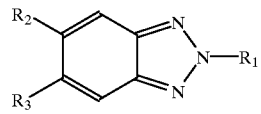

(I)

wherein $R_1$ is selected from the group consisting of

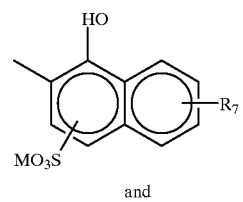

(II)

and

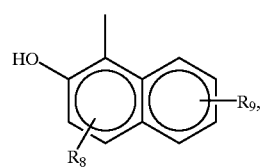

(III)

$R_2$ is selected from the group consisting of —H and halogen; $R_3$ is selected from the group consisting of —H, halogen, lower alkyl, lower alkoxy, —$CO_2M$ and —$SO_3M$; $R_7$ is selected from the group consisting of —H, —$SO_3M$ and —NHICO-lower alkyl; $R_8$ is selected from the group consisting of —H, —$CO_2M$ and —$SO_3M$; $R_9$ is selected from the group consisting of —H, —$CO_2M$, —$SO_3M$ and —NHCO-lower alkyl; and M is selected from the group consisting of —H, —Na, —K, —Li and —N—$(R_{10})_4$ wherein each $R_{10}$ is independently selected from the group consisting of —H, lower alkyl and

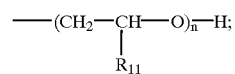

$R_{11}$ is selected from the group consisting of —H, —$CH_3$ and —$CH_2$—$CH_3$; and n is from 1 to 4; and wherein the compound contains one or two —$SO_3M$ groups, one —$SO_3M$ and one —$CO_2M$ group, or two —$CO_2M$ groups.

In a second aspect, the present invention is directed to an ink jet print cartridge comprising an ink jet storage receptacle, an ink jet printhead and an ink jet ink composition comprising ink and a water-soluble ultraviolet absorbing compound of the formula

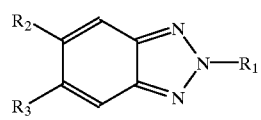

(I)

wherein $R_1$ is selected from the group consisting of

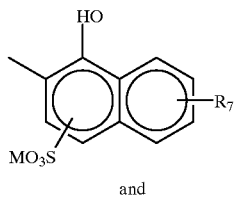
(II)

and

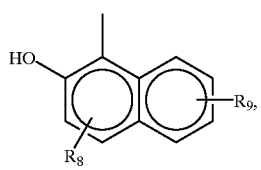
(III)

$R_2$ is selected from the group consisting of —H and halogen; $R_3$ is selected from the group consisting of —H, halogen, lower alkyl, lower alkoxy, —$CO_2M$ and —$SO_3M$, $R_7$ is selected from the group consisting of —H, —$SO_3M$ and —NHCO-lower alkyl; $R_8$ is selected from the group consisting of —H, —$CO_2M$ and —$SO_3M$; $R_9$ is selected from the group consisting of —H, —$CO_2M$, —$SO_3M$ and —NHCO-lower alkyl; and M is selected from the group consisting of —H, —Na, —K, —Li and —N—$(R_{10})_4$ wherein each $R_{10}$ is independently selected from the group consisting of —H, lower alkyl and

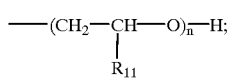

$R_{11}$ is selected from the group consisting of —H, —$CH_3$ and —$CH_2$—$CH_3$; and n is from 1 to 4; and wherein the compound contains one or two —$SO_3M$ groups, one —$SO_3M$ and one —$CO_2M$ group, or two —$CO_2M$ groups.

Another aspect of the present invention comprises an aqueous ink composition comprising ink and a water soluble ultraviolet absorbing compound of the formula

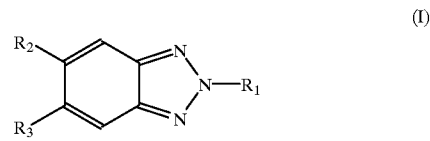
(IV)

wherein $R_2$ is selected from the group consisting of —H and halogen; $R_3$ is selected from the group consisting of —H, halogen, lower alkyl, lower alkoxy, —$CO_2M$ and —$SO_3M$; $R_4$ is selected from the group consisting of halogen, lower alkyl, lower alkoxy, —$CO_2M$ and —$SO_3M$; $R_5$ is selected from the group consisting of —H, halogen, lower alkyl, lower alkoxy, and —OH; $R_6$ is selected from the group consisting of —H, halogen, lower alkyl, lower alkoxy, —$CO_2M$ and —$SO_3M$; M is selected from the group consisting of —H, —Na, —Li and —N—$(R_{10})_4$ wherein each $R_{10}$ is individually selected from the group consisting of —H, lower alkyl and

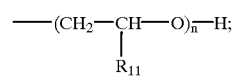

$R_{11}$ is selected from the group consisting of —H, —$CH_3$ and —$CH_2$—$CH_3$; and n is from 1 to 4; and wherein the compound contains one or two —$SO_3M$ groups, one —$SO_3M$ and one —$CO_2M$ group or two —$CO_2M$ groups, with the provision that either (1) $R_2$ and $R_3$ are not both hydrogen, or (2) $R_5$ is not hydrogen.

The ink compositions of the present invention are advantageous in exhibiting, good color lightfastness when printed. The compositions are particularly advantageous for use in ink jet printers owing to the easy and direct combination of the aqueous ink and the water soluble ultraviolet absorber.

Still other objects, advantages and novel features of the present invention will become apparent to those skilled in the art from the following detailed description, which is simply by way of illustration various modes contemplated for carrying out the invention. As will be realized, the invention is capable of other different obvious aspects all without departing from the invention. Accordingly, the description is illustrative in nature and not restrictive.

DETAILED DESCRIPTION

The present invention relates to ink jet ink compositions comprising ink and a water-soluble ultraviolet absorbent compound of the formula

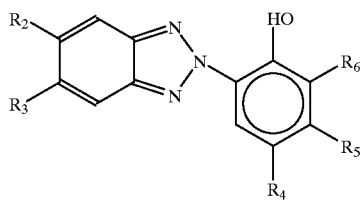
(I)

wherein $R_1$ is selected from the group consisting of

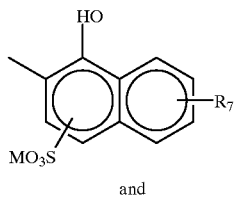
(II)

and

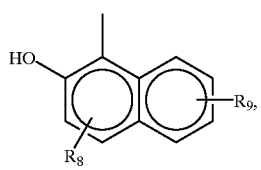
(III)

$R_2$ is selected from the group consisting of —H and halogen; $R_3$ is selected from the group consisting of —H, halogen, lower alkyl, lower alkoxy, —$CO_2M$ and —$SO_3M$; $R_7$ is selected from the group consisting of —H, —$SO_3M$ and —NHCO-lower alkyl; $R_8$ is selected from the group consisting of —H, —$CO_2M$ and —$SOM_$; $R_9$ is selected from the group consisting of —H, —$CO_2M$, —$SO_3M$ and —NHCO-lower alkyl; and M is selected from the group consisting of —H, —Na, —K, —Li and —N—$(R_{10})_4$ wherein each $R_{10}$ is independently selected from the group consisting of —H lower alkyl and

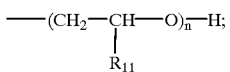

$R_{11}$ is selected from the group consisting of —H, —CH$_3$ and —CH$_2$—CH$_3$; and n is from 1 to 4; and wherein the compound contains one or two —SO$_3$M groups, one —SO$_3$M and one —CO$_2$M group, or two —CO$_2$M groups.

Reference to lower alkyl throughout this specification refers to $C_1$–$C_8$ alkyl, preferably $C_1$–$C_4$ alkyl. In addition, reference to lower alkoxy throughout this specification refers to $C_1$–$C_8$ alkoxy, preferably $C_1$–$C_4$ alkoxy.

Preferred ultraviolet absorbing compounds according to this embodiment of the present invention have the following structural formulas:

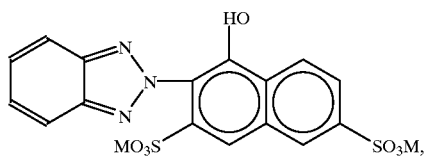
(V)

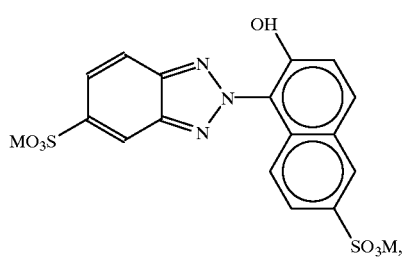
(VI)

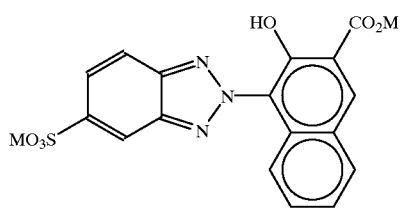
(VII)

Another embodiment of the present invention comprises an ink composition comprising ink and a water-soluble ultraviolet absorbing compound of the formula

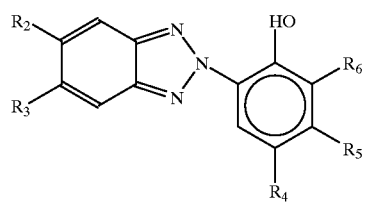
(IV)

wherein $R_2$ is selected from the group consisting of —H and halogen; $R_3$ is selected from the group consisting of —H, halogen, lower alkyl, lower alkoxy, —CO$_2$M and —SO$_3$M; $R_4$ is selected from the group consisting of halogen, lower alkyl, lower alkoxy, —CO$_2$M and —SO$_3$M; $R_5$ is selected from the group consisting of —H, halogen, lower alkyl, lower alkoxy, and —OH; $R_6$ is selected from the group consisting of —H, halogen, lower alkyl, lower alkoxy, —CO$_2$M and —SO$_3$M; M is selected from the group consisting of —H, —Na, —Li and —N—(R$_{10}$)$_4$ wherein each $R_{10}$ is individually selected from the group consisting of —H, lower alkyl and

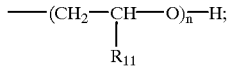

$R_{11}$ is selected from the group consisting of —H, —CH$_3$ and —CH$_2$—C$_3$; and n is from 1 to 4; and wherein the compound contains one or two —SO$_3$M groups, one —SO$_3$M and one —CO$_2$M group or two —CO$_2$M groups, with the provision that either (1) $R_2$ and $R_3$ are not both hydrogen, or (2) $R_5$ is not hydrogen.

Preferred ultraviolet absorbing compounds of the present invention have the following structural formulas

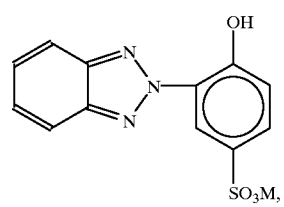
(VIII)

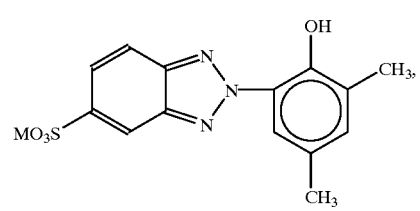
(IX)

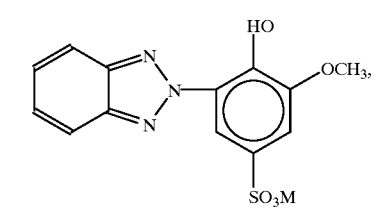
(X)

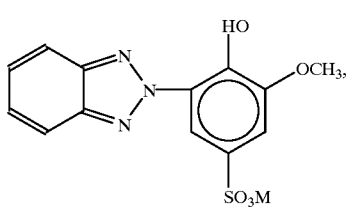
(XI)

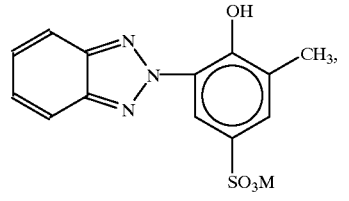
(XII)

The ultraviolet absorbing compounds of this invention have been found to be particularly efficacious in improving light-fastness of prints made with ink jet printers containing conventional dyes employed for such purposes including monoazo, polyazo and copper phthalocyanine dyes. The ultraviolet absorbers of the present invention are highly water-soluble, readily dissolve in the usual aqueous vehicles employed in common ink jet compositions, and remain in solution upon extended storage.

The ultraviolet absorbing compound is included in the ink compositions in an amount sufficient to improve the light-fastness of printed images. Preferably, the ink compositions of the present invention comprise from about 0.1 to about 5% by weight of the ultraviolet absorbing compounds. More preferably, the ink compositions contain from about 1 to about 3% of the ultraviolet absorbing compounds. The ultraviolet absorbing compounds are preferably used in a salt form, which exhibits satisfactory water solubility. Examples of the salt form include sodium, potassium, lithium, ammonium, triethanolammonium, and tetramethylammonium salts, and mixtures of various salt forms. The ultraviolet absorbent compounds are isolable in the free acid form and convertable to any of the salt forms, or alternatively, may be synthesized directly in the desired salt form.

The ultraviolet absorbing compounds of the present invention nay be prepared by diazotizing and coupling an optionally substituted ortho-nitroaniline with a substituted phenol or naphthol which couples in the ortho position to the hydroxyl group, and subsequently reducing the resultant ortho-nitro-ortho'-hydroxy-azo compound to the corresponding benzotriazole in alkaline aqueous medium using, for example, zinc, or more advantageously, hydrogen in the presence of a group VIII noble metal catalyst. These reactions are well known to one of ordinary skill in the art and are more fully described in the chemical literature.

Suitable ortho-nitro anilincs include, for example, 2-nitroaniline, 2-nitroaniline-4-sulfonic acid, 4-amino-3-nitro-benzoic acid, 4-methyl-2-nitroaniline, 4-methoxy-2-nitroaniline, 4-chloro-2-nitroaniline, 5-chloro-2-nitroaniline, 4,5-dichloro-2-nitroaniline, and 4-ethyl-2-nitroaniline, among others.

Suitable phenolic couplers include, for example, 4-hydroxybenzene sulfonic acid, guaiacol sulfonic acid, o-cresol-4-sulfonic acid, p-cresol, 2,4-dimethyl-phenol, 2-hydroxy-5-methyl-benzoic acid, 4-hydroxy-benzoic acid, 2-hydroxy-5-methoxy-benzoic acid, 4-methoxy-phenol, 4-chloro-phenol, 2,4-dichloro-phenol, and 3,4-dichloro-phenol, among others.

Examples of suitable naphthols include, for example, 2-naphthol, 2-naphthol-4-sulfonic acid, 2-naphthol-6-sulfonic acid, 2-naphthol-8-sulfoniic acid, 2-naphthol-3,6-disulfonic acid, 2-naphthol-6,8-disulfonic acid, 2-naphthol-3-carboxylic acid, 2-naphthol-6-carboxylic acid, 1-naphthol-3,6-disulfonic acid, 1-naphthol-3-sulfonic acid, 1-naphthol-4-sulfonic acid; 1-naphthol-5-sulfonic acid, 2-acetamido-5-hydroxy-naphthalene-7-sulfonic acid, 2-acetamido-8-hydroxy-naphthalclne-6-sulfonic acid, and 1-acetamido-8-hydroxy-naphthalene-3,6-disulfonic acid, among others.

The ink compositions of the present invention are aqueous compositions. They contain at least 30% by weight of water, preferably deionized water. In addition to water, they may contain one or more water-miscible solvents, for example in an amount of up to 70% by weight. Selection of a suitable carrier mixture depends on the requirements of the specific application involved, such as desired surface tension and viscosity, the selected pigment or dye, the desired drying time of the inl(, and the type of paper onto which the ink will be printed. Representative examples of water soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols, such as acetone, methylethyl ketone and diacetone alcohol; (3) ethers, such as tetrahydroftirani and dioxane; (4) ethers, such as ethyl acetate, ethyl lactate, ethylene carbonate and propylene carbonate; (5) polyhydric alcohols, such as ethylene glycol, diethylene glycol, triethylene glycol, propylene glycol, tetraetheylene glycol, polyethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethy (or diethyl) ether; (7) nitrogen-containing cyclic compounds, such as pyrrolidone, N-methyl-2-pyrrolidone and 1,3-dimetllyl-2-imidazolidinone; and (8) sulfur-containing compounds, such as dimethyl sulfoxide and tetramethylene sulfone. Other useful organic solvents include lactones and lactams.

Preferred water soluble organic solvents include polyhydric alcohols, such as ethylene glycol, propylene glycol, butylene glycol, triethylene glycol, 1,2,6-hexanetriol, thiodiglycol, hexylene glycol and diethylene glycol; diols, such as butanediol, pentanediol, hexanediol and homologous diols; glycol ethers, such as propylene glycol laureate; glycerol; polyalkyl glycols, such as polyethylene glycol; and lower alkyl ethers of polyhydric alcohols, such as ethylene glycol monomethyl or monoethyl ether, diethylene glycol methyl or ethyl ether, and triethylene glycol monomethyl or monoethyl ether Particularly preferred organic solvents include ethylene glycol, diethylene glycol, and tetraethylene glycol.

In another embodiment of the present invention, the aqueous ink compositions preferably comprise from about 0.5% to about 10% by weight of an insoluble pigment, from about 0.1% to about 5%, preferably from about 1% to about 3%, of an ultraviolet absorbing compound as disclosed above, and an aqueous carrier.

A wide variety of organic and inorganic pigments, alone or in combination, may be selected for use in the aqueous inks of the present invention. The key selection criteria for the pigment is that they must be dispersable in the aqueous medium. The term "pigment," as used herein, means an insoluble colorant. The pigment particles are sufficiently small to permit free flow of the ink through the ink jet printing device, especially at the ejecting nozzles that usually have a diameter ranging from about 10 microns to about 50 microns. The particle size also has an influence on pigment dispersion stability, which is critical throughout the life of the ink. It is also desirable to use small particles for maximum color strength and gloss. The range of useful particle size is from approximately 0.05 micron to approximately 15 microns. Preferably, the pi,gment particle size should range from about 0.05 micron to about 5 microns and most preferably, from about 0.05 micron to about 1 micron.

Pigments suitable for use in the present invention include, for example, azo pigments, such as azo lakes, insoluble azo pigments, condensed azo pigments, and chelate azo pigments, polycyclic pigments, perylene pig,ments, antlhraquinone pigments, quinacridone pigments, dioxazine pigments, thioindigo pigments, isoindolinone pigments, quinoplhthlalonie pigments and dry lakes. Additional organic pigments include nitro pigments, nitroso pigments, aniline black and daylight fluorescent pigments. Preferred pigments include titanium oxide, iron oxide, and carbon black. Examples of commercially available pigments which may be used in the present invention include the following: Heliogen® (T Blue L 6901F (BASF), Heliogen® Blue NBD 7010 (BASF), Heliogen® Blue K 7090 (BASF), Heucophthal® Blue G XBT-583D (Heubach), Irgalite® Rubine 4 BL (Ciba-Geigy), Quindo® Magenta (Mobay), Indofast® Brilliant Scarlet (Mobay), liostaperm® Scarlet GO (Hoechst), Permanent Rubine F6B (Hoechst), Monostral® Scarlet (Ciba-Geigy), Raven® 1170 (Col. Chem.), Special Black 4A (Degussa), Black FW 18 (Degussa), Sterling® NS Black (Cabot), Sterling® NSX 76 (Cabot), Monarch® 880 (Cabot), Tipure® R-101 (DuPont), Mogul L (Cabot), BK 8200 (Paul Ullich), Heliogen® Green K 8683 (BASF), Heliogen® Green L 9140 (BASF), Monostral® Red B (Ciba-Geigy), Monastral® Violet R (Ciba-Geigy), Hostaperm® Orange GR (Hoechst), Paliogen® Orange (BASF), L75-2377 Yellow (Sun Chem.), L74-1357 Yellow (Sun Chem.), Hostaperm® Yellow H4G (Hoechst), Irgazin® Yellow 5GT (Ciba-Geigy), Permanent Yellow G3R-01 (Hoechst), Novoperm® Yellow FGL (Hoechst), Chromophthal® Yellow 3G (Ciba-Geigy), Hansa Yellow X (Hoechst), Dalamar® Yellow YT-858-D (H-leubach) and Hansa Brilliant Yellow 5GX-02 (Hoechst), The ink compositions may also contain conventional amounts of various modifiers such as binders, surfactants, polymer dispersants, biocides, corrosion inhibitors, sequestrants, pH buffers, and/or conductivity additivites. They may also contain further water-soluble ultraviolet light absorbers, if desired.

Another embodiment of the present invention comprises an ink jet print cartridge comprising an ink jet ink storage receptacle, an ink jet printhead and an ink jet ink composition comprising ink and a water-soluble ultraviolet absorbing compound of the formula

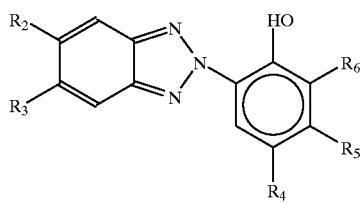

(IV)

wherein $R_2$ is selected from the group consisting of —H and halogen; $R_3$ is selected from the group consisting of —H, halogen, lower alkyl, lower alkoxy, —$CO_2M$ and —$SO_3M$; $R_4$ is selected from the group consisting of halogen, lower alkyl, lower alkoxy, —$CO_2M$ and —$SO_3M$; $R_5$ is selected from the group consisting of —H, halogen, lower alkyl, lower alkoxy, and —OH; R6 is selected from the group consisting of —H, halogen, lower alkyl, lower alkoxy, —$CO_2M$ and —$SO_3M$; M is selected from the group consisting of —H, —Na, —Li and —N—$(R_{10})_4$ wherein each $R_{10}$ is individually selected from the group consisting of —H, lower alkyl and

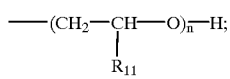

$R_{11}$ is selected from the group consisting of —H, —$CH_3$ and —$C_2$—$CH_3$; and n is from 1 to 4; and wherein the compound contains one or two —$SO_3M$ groups, one —$SO_3M$ and one —$CO_2M$ gyroup or two —$CO_2M$ groups, with the provision that either (1) $R_2$ and $R_3$ are not hydrogen, or (2) $R_5$ is not hydrogen.

Suitable ink jet ink storage receptacles and ink jet printheads are disclosed, for example, in U.S. Pat. Nos. 5,661,510, 5,751,324, 5,818,478 and 5,719,605, all of which are incorporated herein by reference.

The following examples demonstrate various embodiments and advantages of the ink compositions and ink jet print cartridges containing the ultraviolet absorbing compounds of the present invention. In the examples and throughout the present specification, parts and percentages are by weight unless otherwise indicated.

EXAMPLE 1

This example is directed to ink compositions of the present invention which utilize the ultraviolet absorbing compound having the structural formula

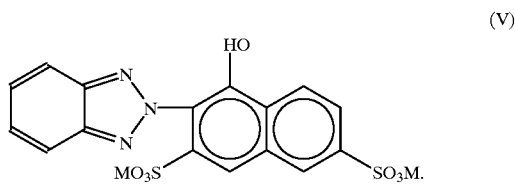

(V)

The ink jet ink compositions were formulated using conventional ink jet inks comprising either sodium dye salts or tetramethylammonium (TMA) dye salt. A yellow ink was formulated employing a tetramethylammonium (TMA) dye salt and 3% of the ultraviolet absorbing compound (V). Magenta and cyan inks were formulated using sodium dye salts and 3% of the ultraviolet absorbing compound (V). Comparative ink jet compositions were formulated using conventional cyan, magneta and yellow inks without incorporating the 3% ultraviolet absorbing compound.

Light-fastness was measured by determining the delta E value between a control ink that has had no exposure to light and a sample that has been exposed to a Xenon Arc lamp for 48 hours. Therefore, the lower the delta E value, the better the light-fastness of the ink composition. Each of the ink compositions of the present invention and the comparative ink compositions of this example were used in ink jet recording on three different types of paper: plain (Xerox 4200), coated (Hi Res), and photo (Lexmark). Table 1 summarizes the delta E values for the ink jet ink compositions of the present invention and the comparative ink jet ink compositions.

TABLE 1

| Type of Ink | Plain Paper, ΔE | Coated Paper, ΔE | Photo Paper, ΔE |
|---|---|---|---|
| Cyan Ink (Comparative) | 3.51 | 4.72 | 22.29 |
| Cyan Ink w/3% UVA | 2.73 | 2.93 | 5.94 |
| Magenta Ink (Comparative) | 8.69 | 33.05 | 27.55 |
| Magenta Ink w/3% UVA | 11.15 | 23.79 | 30.53 |
| Yellow Ink (Comparative) | 16.26 | 41.56 | 34.56 |
| Yellow Ink w/3% UVA | 9.96 | 17.78 | 2.96 |

As can be seen by the results in Table 1, the ink jet ink compositions comprising the ultraviolet absorbing compound showed dramatic improvement in light-fastness for most of the ink compositions in various paper types. Furthermore, the most dramatic improvement in lightfastness was demonstrated by the yellow ink containing the 3% ultraviolet absorbing compound. The yellow ink employs a tetramethylammonium (TMA) dye salt as compared to the sodium dye salts used in the magenta and cyan inks.

EXAMPLE 2

This example is directed to ink jet ink compositions of the present invention comprising the ultraviolet absorbing compound having the following structural formula

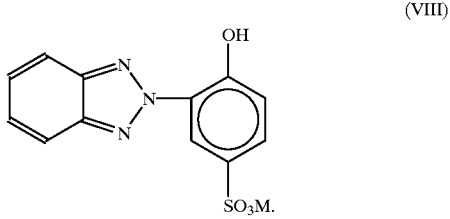

(VIII)

Similar to the methods shown in Example 1, ink jet ink compositions were prepared using conventional ink jet inks and 3% of the ultraviolet absorbing compound VIII as shown above. Comparative ink jet ink compositions were formulated comprising the same ink jet inks without the 3% ultraviolet absorbing compound. The yellow ink was prepared using a TMA dye salt while the magenta and cyan inks were prepared using sodium dye salts.

Similar to Example 1, the ink jet ink compositions of the present invention and the comparative ink jet inks were then used in ink jet printing on the three types of paper as described in Example 1. Light-fastness of the ink jet ink compositions was then measured as described in Example 1. Table 2 details the delta E values for the present example.

TABLE 2

| Type of Ink | Plain Paper, ΔE | Coated Paper, ΔE | Photo Paper, ΔE |
| --- | --- | --- | --- |
| Cyan Ink (Comparative) | 3.51 | 4.72 | 22.29 |
| Cyan Ink w/3% UVA | 6.74 | 4.43 | 11.28 |
| Magenta Ink (Comparative) | 8.69 | 33.05 | 27.55 |
| Magenta Ink w/3% UVA | 8.13 | 26.31 | 15.36 |
| Yellow Ink (Comparative) | 16.26 | 41.56 | 34.56 |
| Yellow Ink w/3% UVA | 6.69 | 22.81 | 1.70 |

As shown in Table 2, the ink jet ink compositions of the present invention employing a 3% ultraviolet absorbing compound showed dramatically lower delta E values than the comparative inkjet ink compositions. Therefore, the ink jet ink compositions of the present invention have superior light-fastness as compared to conventional ink jet ink compositions. It can be noted from Table 2 that the most dramatic improvement with the 3% ultraviolet absorbing compound was seen with the yellow ink.

EXAMPLE 3

Ink jet ink compositions of the present invention which utilize the ultraviolet absorbing compound of Example 2 were formulated. Tetramethylammonium dye salts were employed in making the yellow, magenta and cyan inks. The tetramethylammonium dye salts were mixed with 3% of the ultraviolet absorbing compound to form yellow, magenta and cyan ink jet ink compositions. Comparative ink jet ink compositions were also prepared as detailed in Example 1.

The ink jet ink compositions of the present invention and the comparative ink jet ink compositions were then used for ink jet printing to measure light-fastness as described in Example 1. Table 3 details the results of this example.

TABLE 3

| Type of Ink | Plain Paper, ΔE | Coated Paper, ΔE | Photo Paper, ΔE |
| --- | --- | --- | --- |
| Cyan Ink (comparative, Na salt) | 1.73 | 2.79 | 17.74 |
| Cyan Ink (3% UVA, Na salt) | 2.09 | 3.19 | 12.34 |
| Cyan Ink (3% UVA, TMA) | 1.99 | 2.71 | 5.36 |
| Magenta Ink (comparative, Na salt) | 9.46 | 26.36 | 21.81 |
| Magenta Ink (3% UVA, Na salt) | 8.35 | 25.53 | 23.35 |
| Magenta Ink (3% UVA, TMA) | 7.46 | 20.93 | 13.55 |
| Yellow Ink (comparative, TMA salt) | 17.29 | 32.28 | 34.92 |
| Yellow Ink (3% UVA, Na salt) | 12.59 | 31.19 | 28.00 |
| Yellow Ink (3% UVA, TMA) | 7.34 | 18.05 | 2.70 |

As shown in Table 3, ink jet ink compositions comprising the ultraviolet absorbing compounds of the present invention demonstrate improvements in light-fastness. Moreover, the most dramatic improvement in light-fastness was seen with the ink jet ink compositions comprising tetramethylammonium dye salts and the ultraviolet absorbing compounds of the present invention.

The examples demonstrate that the ink jet ink compositions according to the present invention exhibit surprising results in the improvement of light-fastness over conventional ink jet ink compositions.

The various preferred embodiments and examples set forth herein are presented in order to further illustrate the claimed invention and are not intended to be limiting thereof. Additional embodiments and alternatives within the scope of the claimed invention will be apparent to those of ordinary skill in the art.

What is claimed is:

1. An ink composition comprising ink and a water soluble ultraviolet absorbing compound of the formula

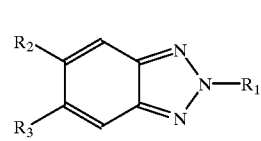

(I)

wherein $R_1$ is selected from the group consisting of

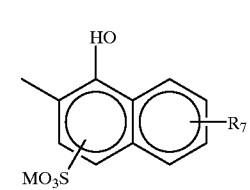

(II)

and

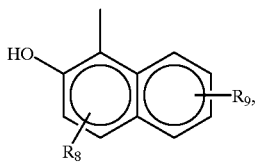

(III)

$R_2$ is selected from the group consisting of —H and halogen;
$R_3$ is selected from the group consisting of —H, halogen, lower alkyl, lower alkoxy, —CO$_2$M and —SO$_3$M; R$_7$ is selected from the group consisting of —H, —SO$_3$M and —NHCO-lower alkyl; R$_8$ is selected from the group consisting of —H, —CO$_2$M and —SO$_3$M; R$_9$ is selected from the group consisting of —H, —CO$_2$M, —SO$_3$M and —NHCO-lower alkyl; and M is selected from the group consisting of —H, —Na, —K, —Li and —N—(R$_{10}$)$_4$ wherein each R$_{10}$ is independently selected from the (group consisting of —H, lower alkyl and

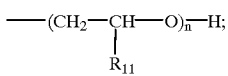

R$_{11}$ is selected from the group consisting of —H, —CH$_3$ and —CH$_2$—CH$_3$; and n is from 1 to 4; and wherein the compound contains one or two —SO$_3$M groups, one —SO$_3$M and one —CO$_2$M group, or two —CO$_2$M groups.

2. The ink composition of claim 1, wherein R$_1$ is

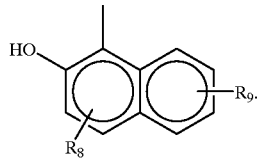

(III)

3. The ink composition of claim 2, wherein R$_8$ is —H.
4. The ink composition of claim 2, wherein R$_9$ is —SO$_3$M.
5. The ink composition of claim 3, wherein R$_9$ is —SO$_3$M.
6. The ink composition of claim 2, wherein R$_9$ is —H.
7. The ink composition of claim 2, wherein R$_8$ is —CO$_2$M.
8. The ink composition of claim 5, wherein R$_2$ is —H.
9. The ink composition of claim 8, wherein R$_3$ is —SO$_3$M.
10. The ink composition of claim 7, wherein R$_2$ is —H.
11. The ink composition of claim 10, wherein R$_3$ is —SO$_3$M.
12. The ink composition of claim 1, wherein R$_1$ is

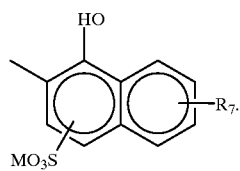

(II)

13. The ink composition of claim 12, wherein R$_2$ is —H and R$_3$ is —H.
14. The ink composition of claim 12, wherein R$_7$ is —SO$_3$M.
15. The ink composition of claim 13, wherein R$_7$ is —SO$_3$M.
16. The ink composition of claim 13, wherein R$_7$ is —CO$_2$M.
17. The ink composition of claim 1, wherein the ink comprises ammonium dye salt.
18. The ink composition of claim 17, wherein the ink comprises tetramethylammonium dye salt.
19. The ink composition of claim 2, wherein the ink comprises ammonium dye salt.

20. The ink composition of claim 19, wherein the ink comprises tetramethylammonium dye salt.
21. The ink composition of claim 12, wherein the ink comprises ammonium dye salt.
22. The ink composition of claim 21, wherein the ink comprises tetramethylammonium dye salt.
23. An ink jet print cartridge comprising an ink jet ink storage receptacle, an ink jet printhead and an ink jet ink composition comprising ink and a water soluble ultraviolet absorbing compound of the formula

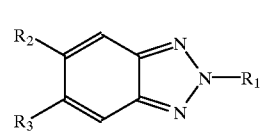

(I)

wherein R$_1$ is selected from the group consisting of

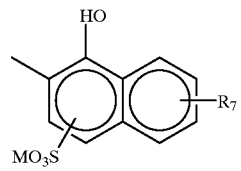

(II)

and

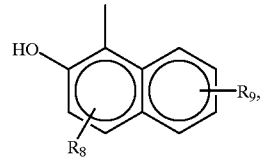

(III)

R$_2$ is selected from the group consisting of —H and halogen; R$_3$ is selected from the group consisting of —H, halogen, lower alkyl, lower alkoxy, —CO$_2$M and —SO$_3$M; R$_7$ is selected from the group consisting of —H, —SO$_3$M and —NHCO-lower alkyl; R$_8$ is selected from the group consisting of —H, —CO$_2$M and —SO$_3$M; R$_9$ is selected from the group consisting of —H, —CO$_2$M, —SO$_3$M and —NHCO-lower alkyl; and M is selected from the group consisting of —H, —Na, —K, —Li and —N—(R$_{10}$)$_4$ wherein each R$_{10}$ is independently selected from the group consisting of —H, lower alkyl and

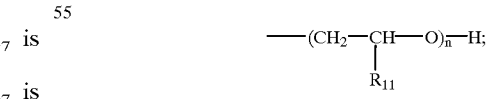

R$_{11}$ is selected from the group consisting of —H, —CH$_3$ and —CH$_2$—CH$_3$; and n is from 1 to 4; and wherein the compound contains one or two —SO$_3$M groups, one —SO$_3$M and one —CO$_2$M group, or two —CO$_2$M groups.

24. An ink composition comprising ink and a water soluble ultraviolet absorbing compound of the formula

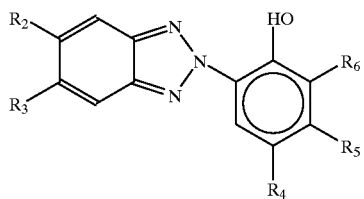

(IV)

wherein $R_2$ is selected from the group consisting of —H and halogen; $R_3$ is selected form the group consisting of —H, halogen, lower alkyl, lower alkoxy, —$CO_2M$ and —$SO_3M$ ; $R_4$ is selected from the group consisting of —$CO_2M$ and —$SO_3M$ ; $R_5$ is selected from the group consisting of —H, halogen, lower alkyl, lower alkoxy, and —OH; $R_6$ is selected from the group consisting of —H, halogen, lower alkyl, lower alkoxy, —$CO_2M$ and —$SO_3M$; M is selected from the group consisting of —H, —Na —Li and —N—($R_{10})_4$ wherein each $R_{10}$ is individually selected from the group consisting of —H, lower alkyl and

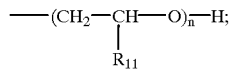

$R_{11}$ is selected from the group consisting of —H, —$CH_3$ and —$CH_2$—$CH_3$; and n is from 1 to 4; and wherein the compound contains one or two —$SO_3M$ groups, one —$SO_3M$ and one —$CO_2M$ group or two —$CO_2M$ groups, with the provision that either (1) $R_2$ and $R_3$ are not both hydrogen, or (2) $R_5$ is not hydrogen.

25. The ink composition of claim 24, wherein the ink comprises ammonium dye salt.

26. The ink composition of claim 25, wherein the ink comprises tetramethylammonium dye salt.

* * * * *

UNITED STATES PATENT AND TRADEMARK OFFICE
CERTIFICATE OF CORRECTION

PATENT NO. : 6,251,173 B1
DATED : June 26, 2001
INVENTOR(S) : Ann P. Holloway et al.

It is certified that error appears in the above-identified patent and that said Letters Patent is hereby corrected as shown below:

Title page,
References Cited, U.S. PATENT DOCUMENTS, U.S. Patent No. 5,276,161, Date of Patent 1/1994, Prestel et al., 548/260, change "1/1994" to -- 6/1994 --.

OTHER PUBLICATIONS, Derwnet ABSTRACT of JP3073299, Feb. 2000, change "Derwnet" to -- Derwent --.

Column 3,
Line 23, change "$SO_3M$," to -- $SO_3M$; --.

Column 4,
Line 13, change "tageous in exhibiting," to -- tageous in exhibiting --.
Line 64, change "SOM.;" to -- $SO_3M$; --.

Column 7,
Line 55, change "naphthalelne" to -- napthalene --.
Line 66, change "inl(," to -- ink --.

Column 8,
Line 7, change "tetrahydroftirani" to -- tetrahydrofuran --.
Line 20, change "dimetllyl" to -- dimethyl --.
Line 64, change "pig,ments, antl-hraquinone" to -- pigments, ant-hraquinone --.
Line 66, change "quinoplhthlalonie" to -- quinophthalone --.

UNITED STATES PATENT AND TRADEMARK OFFICE
CERTIFICATE OF CORRECTION

PATENT NO.     : 6,251,173 B1
DATED          : June 26, 2001
INVENTOR(S)    : Ann P. Holloway et al.

It is certified that error appears in the above-identified patent and that said Letters Patent is hereby corrected as shown below:

<u>Column 9,</u>
Line 9, change "liostaperm®" to -- Hostaperm® --.
Line 14, change "Ullich" to -- Uhlich --.
Line 24, change "(H-leubach)" to -- (Heubach) --.

<u>Column 10,</u>
Line 5, change "lheads" to -- heads --.

<u>Column 13, claim 8,</u>
Line 37, change "whercin" to -- wherein --.

<u>Column 13, claim 10,</u>
Line 40, change "whercin" to -- wherein --.

Signed and Sealed this

Fifteenth Day of January, 2002

*Attest:*

JAMES E. ROGAN
*Attesting Officer*    *Director of the United States Patent and Trademark Office*